United States Patent Office 3,743,481
Patented July 3, 1973

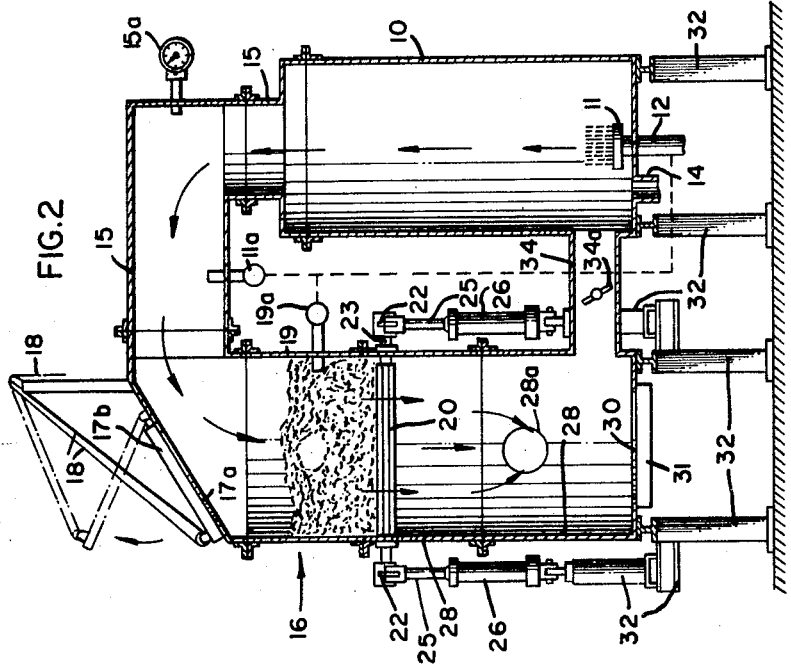
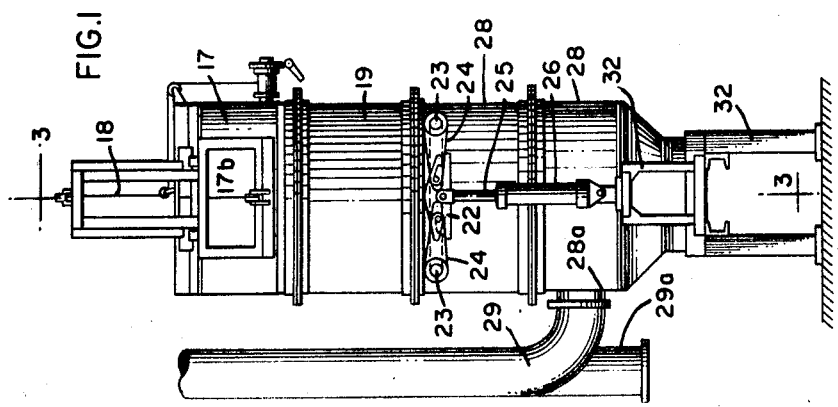

3,743,481
APPARATUS FOR REMOVING SELENIUM
Umeo Nakano, Montreal, Quebec, Canada, assignor to Noranda Mines Limited, Toronto, Ontario, Canada
Original application Apr. 1, 1969, Ser. No. 811,907, now Patent No. 3,627,486. Divided and this application Feb. 17, 1971, Ser. No. 116,227
Int. Cl. B01j 1/00
U.S. Cl. 23—277 R   2 Claims

ABSTRACT OF THE DISCLOSURE

In an operation wherein selenium values are recovered from pelletized selenium-containing materials involving heating pelletized selenium-containing materials in the presence of air so as to volatilize the selenium from said pelletized selenium-containing materials in the form of selenium dioxide, improved results are obtained by employing an apparatus wherein a mass of pelletized selenium-containing material is maintained static within a roasting zone and preheated air employed to heat the mass of pelletized selenium-containing materials is passed downwardly through said mass of pelletized selenium-containing materials maintained at a temperature of about 1350° F. for a period of time in the range about 1–6 hours sufficient to volatilize substantially all of the selenium from said pelletized selenium-containing materials and thereupon discharging the resulting substantially deselenized pelletized material from said roasting zone.

---

This is a division of application Ser. No. 811,907 filed Apr. 1, 1969, now U.S. 3,627,486.

This invention is concerned with recovery of selenium values from selenium-containing materials, such as copper anode slimes, muds, sludges, dusts and the like. More particularly, this invention is directed to the recovery of selenium in the form of selenium dioxide from selenium-containing tank house slimes resulting from the electrolytic refining of copper. In one embodiment this invention is directed to apparatus for the recovery of selenium in the form of selenium dioxide from decopperized tank house slimes, i.e. slimes from which a substantial amount of the copper has been removed, resulting from the electrolytic refining of copper.

Various apparatus are known for the recovery of selenium in the form of selenium dioxide from selenium-containing materials, such as tank house slimes, see particularly U.S. Pat. 2,948,591 and Canadian Pat. 588,098. For the most part, however, the apparatus known heretofore have not been completely satisfactory, particularly from the point of view of ease of operation and apparatus simplicity and productivity.

It is an object of this invention to provide an improved apparatus for the recovery of selenium values from pelletized selenium-containing materials, particularly pelletized decopperized tank house slimes.

It is another object of this invention to provide an apparatus having increased productivity for the recovery of selenium values from pelletized selenium-containing materials.

How these and other objects of this invention are achieved will become apparent in the light of the accompanying disclosure made with reference to the accompanying drawings wherein:

FIG. 1 is a side view of an apparatus useful in accordance with this invention for the recovery of selenium values from pelletized decopperized selenium-containing slimes; and wherein FIG. 2 is a cross sectional view of the apparatus of FIG. 1 taken in the direction of arrows 3—3.

In at least one embodiment of this invention at least one of the foregoing objects will be achieved.

It has been discovered that improved results are obtained in an apparatus useful for the recovery of selenium values from pelletized selenium-containing materials, such as pelletized selenium-bearing tank house slimes, by forming a static mass of pelletized selenium-containing materials within a roasting zone and heating the mass of pelletized selenium-containing materials to a suitable elevated temperature, preferably by contact with a preheated gas, such as air or other suitable oxygen-containing gas, so as to volatilize the selenium contained in said pelletized selenium-containing materials, such as to volatilize the selenium as selenium dioxide, maintaining said mass of pelletized selenium-containing materials static relative to and within said roasting zone and moving a hot oxygen-containing gas, such as preheated air, therethrough while maintaining the static mass of pelletized selenium-containing materials at a suitable elevated temperature, such as a temperature in the range 1300–1400° F., e.g. about 1350° F., for a period of time sufficient to volatilize therefrom a substantial amount, preferably substantially all, of the selenium for eventual treatment and recovery.

Reference is now made to FIGS. 1 and 2 of the drawings which illustrate an apparatus suitable in accordance with an embodiment of this invention for the recovery of selenium values in the form of selenium dioxide from pelletized decopperized selenium-containing tank house slimes. Air preheater 10 is provided with burner 11 suitable for the combustion of a hydrocarbon fuel or the equivalent, such as natural gas, propane, or a light fuel oil. Burner 11 is supplied with fuel and a suitable amount of air, preferably an amount of air in excess of the amount required to effect complete combustion of the fuel, via line 12. An additional amount of air is supplied to air preheater 10 via line 14. The total amount of air supplied to air preheater 10 via lines 14 and 12 is substantially in excess of the amount of air required to effect complete combustion of the hydrocarbon fuel in burner 11.

The resulting heated air moves from the top of air preheater 10 via conduit or flue 15 into a roaster generally indicated by reference numeral 16. Roaster 16 includes a top portion or cover 17 which is provided with an opening 17a and a door 17b adapted to cover opening 17a. Door 17b is adapted to be moved or lifted from cover 17 by means of cables 18 actuated by suitable means, not shown, so as to uncover opening 17a and provide access to the interior of roaster 16.

Grates 20 are provided at the bottom of roaster 16 and are located at the bottom of central portion 19 thereof and are adapted, in the position illustrated, to support static permeable mass 21 of pelletized decopperized anode slimes.

Grates 20 are pivotally mounted at the bottom of roaster 16 for a swinging downward movement on bars 23 which are operatively fixed to yoke 22 by arms 24. Yoke 22 is in turn fixed to piston rod 25 which is actuated hydraulically or pneumatically by cylinder 26 so as to move yoke 22 downwardly or upwardly. When yoke 22 is moved upwardly by piston rod 25 grates 20 are closed to support a mass of pelletized slimes thereon. When yoke 22 is moved downwardly grates 20 are swung downwardly to open and to discharge and pelletized slimes from within roaster 16 into discharge zone 28 located directly beneath grates 20.

Discharge zone 28 is provided with opening 28a in the side wall thereof for the exit of the hot air supplied to roaster 16 from air preheater 10 via conduit 15 and the volatilized selenium values, i.e. volatilized selenium dioxide, derived from the pelletized slimes being roasted within roaster 16. The hot gases and volatilized selenium dioxide moves through opening 28a of discharge zone 28 into flue 29 for treatment and eventually recovery in accordance with this invention. Flue 29, as illustrated, is provided with a bottom cleanout section 29a for the collection and removal of some of the solids and dusts which may be transported from discharge zone 28 through opening 28a into flue 29 by the hot air.

The bottom portion of discharge zone 28 is provided with opening 30 covered by door 31 which is adapted to be moved away from opening 30 by means not illustrated to permit the discharge of any solids material dumped from roaster 16 and collected in the bottom of discharge zone 28. As illustrated in the drawings air preheater 10 and roaster 16 together with discharge zone 28 and the associated appurtenances including hydraulically or pneumatically actuated cylinders 26 are carried on suitable supporting structures 32.

In operation, the pelletized selenium-containing material is loaded through charging opening 17a into roaster 16 onto grates 20 and door 17b lowered to cover opening 17a. Burner 11 is lit and air under pressure from a blower, not shown, is admitted into air preheater 10 via conduit 14. Air is also introduced into air preheater 10 via conduit 12 together with the fuel supply. The amount of air admitted to air preheater 10 is suitably metered and the temperature of the hot oxidizing gases within air preheater 10 is initially controlled by thermocouple 11a operatively connected to burner 11 and the air supplied thereto. Another thermocouple 19a embedded in mass 21 of the pelletized selenium-containing material serves to hold mass 21 at a desired temperature or temperature range.

Pressure regulator 15a is operatively connected to a blower supplying air to air preheater 10 via conduit 14 and/or conduit 12 to regulate the pressure within roaster 16. During initial operation it is advisable to bypass some heated air from preheater 10 via bypass conduit 34 which is provided with damper 34a into bottom portion of discharge zone 28 of roaster 16 to oxidize the selenium which is usually emitted in elemental form at the start up of the roaster operation. If desired, a timing mechanism may be used to cut off the flow of hot gases from air preheater 10 into discharge zone 28 of roaster 16 via bypass conduit 34 after a predetermined time interval. The hot gases containing the selenium values exit roaster 16 via opening 28a in discharge zone 28.

Hot air is passed through the mass of pelletized selenium-containing material within roaster 16 until substantially all of the selenium values therein have been removed in the form of selenium dioxide. The resulting volatilized selenium dioxide leaves roaster 16 via discharge zone 28 and opening 28a and the flue 29 for eventual recovery by means of a water scrubber, not shown, or other suitable means. After substantially all of the senium values have been volatilized from the mass 22 of pelletized selenium-containing material, the mass of the deselenized pellets is discharged by opening grates 20. The deselenized pellets then drop into discharge zone 28 of roaster 16. Thereupon, by opening bottom door 31 the deselenized pellets can be removed into a suitable collecting means.

Advantages of the apparatus and process of this invention reside in the fact that the roaster need not be configured to any particular or critical shape and the space requirements for the overall apparatus in operation are relatively small. Further, this invention permits the utilization of the exothermic heat of oxidation to deselenize the pelletized slimes. Another advantage is the fact that practically all of the quipment except for the alloy grating bars may be lined with insulating and/or refractory brick so that equipment maintenance costs are very low. Usually it is advisable to line all equipment operating in the 1000–1500° F. range with insulating brick or the like. The apparatus and process of the invention have the ability to deselenize a mass of pelletized selenium-containing material having a substantial depth without the formation of fused agglomerates.

The following example is illustrative of the practice of this invention:

EXAMPLE

A batch of 2000 pounds of decopperized selenium-containing slimes from the electrolytic refining of copper containing 18% by weight selenium was combined with 160 pounds of bentonite and the mixture was pulverized thoroughly in a mixing muller. The muller mixture was agglomerated in a pelletizer to form pellets of a ¼"–¾" diameter. The moisture content of the pellets was 9%.

The pellets were charged into roaster 16 through door 17b onto the grates 20 to a depth of 18 inches. The charging door 17b was sealed and the burner 11 was lit with thermocouple 11a set at 1200° F. Propane was burned in burner 11. The oxidizing air was metered through conduit 14 so that the superficial gas velocity through the bed of pelletized slimes within roaster 16 at ambient conditions was about 100 f.p.m. The pressure as measured at pressure tap 15a was 8 inches of water. Some hot oxygen-containing gases were bypassed from air preheater 10 via conduit 34 into discharge zone 28 of roaster 16 to oxidize into selenium dioxide some of the elemental selenium which was volatilized from the pellets at the start of the roasting operation.

After one-half hour the controlling thermocouple was switched from thermocouple 11a to thermocouple 19a, thermocouple 19a being placed some three inches deep in the bed of pellets. The set point of the control thermocouple 19a was set at 1350° F. for the regulation of B.t.u. input of burner 11.

After 4½ hours, burner 11 was shut off but air was moved through preheater 10 to cool the roasted pellets. After ½ hour the flow of cooling air was turned off and grates 20 opened. Then discharge door 31 was opened to discharge the deselenized pellets.

There were no fused agglomerates in the deselenized roasted pellets. The average selenium content was sufficiently low to permit smelting the product to dore metal without difficulty in a dore furnace. The calculated degree of selenium elimination was 87%.

As will be apparent to those skilled in the art in the light of the foregoing disclosure, many modifications, alterations and substitutions are possible in the practice of this invention without departing from the spirit or scope thereof.

What is claimed is:

1. Apparatus useful for the recovery of selenium values from pelletized selenium-containing material comprising air preheating means for heating air supplied thereto to an elevated temperature, a roasting chamber for roasting said pelletized selenium-containing material, first conduit means for supplying heated air at said elevated temperature from said air preheating means to the upper portion of said roasting chamber for downward flow through said roasting chamber, said roasting chamber being provided with a charging opening at the top thereof for charging said pelletized selenium-containing material, a discharge chamber positioned directly beneath said roasting chamber, a grate means provided at the bottom of said roasting chamber for supporting a mass of said pelletized selenium-containing material therein and operative to discharge said pelletized selenium-containing material from said roasting chamber to said discharge chamber after the selenium has been volatilized from the mass of pelletized selenium-containing material within said roasting chamber by the downward flow of said heated air therethrough, a discharge opening provided in the bottom of said discharge chamber for the discharge of the pelletized material discharged from said roasting chamber into said discharge chamber, second conduit means in communication with said discharge chamber above the discharge opening of said discharge chamber for the recovery of selenium values volatilized from said pelletized selenium-containing material in said roasting chamber and thermocouple means provided in said first conduit means and for positioning in the mass of said pelletized selenium-containing material within said roasting chamber for controlling the temperature of the heated air supplied from said air preheating means to said roasting chamber and the temperature of said mass of pelletized selenium-containing material within said roasting zone.

2. Apparatus in accordance with claim 1 wherein a bypass conduit is provided communicating said air preheating means with said discharge chamber for supplying heated air directly from said air preheating means to said discharge chamber and wherein flow control means is provided associated with said bypass conduit for control of the amount of heated air supplied directly from said air preheating means to said discharge chamber.

References Cited
UNITED STATES PATENTS

| | | | |
|---|---|---|---|
| 2,056,564 | 10/1936 | Carter | 266—20 X |
| 2,277,355 | 3/1942 | Roderick et al. | 23—277 R |
| 1,862,751 | 6/1932 | Ingraham | 266—20 X |
| 1,840,723 | 1/1932 | King | 34—46 X |

JAMES H. TAYMAN, JR., Primary Examiner

U.S. Cl. X.R.

23—264, 294, 262; 266—20, 30, 21; 75—7; 34—46; 423—509